(12) United States Patent
Hong et al.

(10) Patent No.: US 12,457,164 B2
(45) Date of Patent: Oct. 28, 2025

(54) NUMA-AWARE OUTPUT INTERFACE SELECTION

(71) Applicant: VMware LLC, Palo Alto, CA (US)

(72) Inventors: Xinhua Hong, Milpitas, CA (US); Jochen Behrens, Santa Cruz, CA (US); Yu Ying, Cupertino, CA (US); Pankaj Gupta, Fremont, CA (US)

(73) Assignee: VMware LLC, Palo Alto, CA (US)

( * ) Notice: Subject to any disclaimer, the term of this patent is extended or adjusted under 35 U.S.C. 154(b) by 235 days.

(21) Appl. No.: 18/243,781

(22) Filed: Sep. 8, 2023

(65) Prior Publication Data
US 2025/0088449 A1    Mar. 13, 2025

(51) Int. Cl.
*H04L 45/02* (2022.01)
*H04L 45/125* (2022.01)
*H04L 45/24* (2022.01)

(52) U.S. Cl.
CPC ............ *H04L 45/02* (2013.01); *H04L 45/125* (2013.01); *H04L 45/24* (2013.01)

(58) Field of Classification Search
CPC ....... H04L 45/02; H04L 45/125; H04L 45/24; H04L 45/037; H04L 45/0377
See application file for complete search history.

(56) References Cited

U.S. PATENT DOCUMENTS

| | | | | |
|---|---|---|---|---|
| 6,105,053 A | * | 8/2000 | Kimmel | G06F 9/5016 718/105 |
| 6,275,900 B1 | * | 8/2001 | Liberty | G06F 12/0813 711/120 |
| 6,804,703 B1 | * | 10/2004 | Allen | H04L 69/40 714/13 |
| 7,152,178 B1 | * | 12/2006 | Vook | H04L 45/24 714/4.3 |
| 2003/0061395 A1 | * | 3/2003 | Kingsbury | G06F 9/30087 719/312 |

(Continued)

FOREIGN PATENT DOCUMENTS

EP    4075757 A1    10/2022

OTHER PUBLICATIONS

He, Dongsheng, et al. "NUMA-Aware Contention Scheduling on Multicore Systems." 2021 16th International Conference on Intelligent Systems and Knowledge Engineering (ISKE). IEEE, 2021.*

(Continued)

*Primary Examiner* — Jimmy H Tran
(74) *Attorney, Agent, or Firm* — Kim & Stewart LLP

(57) ABSTRACT

Some embodiments provide a method for a data message processing device that includes multiple network interfaces associated with at least two different non-uniform memory access (NUMA) nodes. The method receives a data message at a first network interface associated with a particular one of the NUMA nodes. Based on processing of the data message, the method identifies multiple output options for the data message. Each of the output options has an equal forwarding cost and each output option is associated with a respective one of the NUMA nodes. The method selects an output option for the data message that is associated with the particular NUMA node to avoid cross-NUMA node processing of the data message.

20 Claims, 13 Drawing Sheets

(56) References Cited

U.S. PATENT DOCUMENTS

| | | | | |
|---|---|---|---|---|
| 2004/0236922 A1* | 11/2004 | Boucher | G06F 17/142 | 711/170 |
| 2004/0243660 A1* | 12/2004 | Chew | G06F 9/5061 | 709/200 |
| 2012/0072622 A1* | 3/2012 | Droux | G06F 9/505 | 710/36 |
| 2012/0102500 A1* | 4/2012 | Waddington | G06F 9/5061 | 718/104 |
| 2012/0102501 A1* | 4/2012 | Waddington | G06F 9/5061 | 718/105 |
| 2013/0024875 A1* | 1/2013 | Wang | G06F 9/542 | 719/318 |
| 2014/0122634 A1* | 5/2014 | Conner | H04L 12/56 | 709/212 |
| 2014/0185593 A1* | 7/2014 | Wang | G06F 3/00 | 370/336 |
| 2014/0237197 A1* | 8/2014 | Gray | G06F 3/061 | 711/153 |
| 2015/0220430 A1* | 8/2015 | Kim | G06F 12/0223 | 709/217 |
| 2015/0339167 A1* | 11/2015 | Takeuchi | G06F 9/5027 | 718/1 |
| 2016/0085571 A1* | 3/2016 | Kim | G06F 9/48 | 718/1 |
| 2016/0285971 A1* | 9/2016 | Bilas | H04L 69/321 | |
| 2017/0289036 A1* | 10/2017 | Vasudevan | H04L 49/70 | |
| 2019/0297013 A1* | 9/2019 | Xin | H04L 45/74 | |
| 2020/0228451 A1* | 7/2020 | Luo | G06F 9/45558 | |
| 2020/0242723 A1* | 7/2020 | Colenbrander | A63F 13/355 | |
| 2020/0389388 A1* | 12/2020 | Liu | H04L 45/745 | |
| 2021/0273886 A1* | 9/2021 | Luo | H04L 49/3063 | |
| 2021/0295100 A1* | 9/2021 | Chen | G06F 18/214 | |
| 2022/0143499 A1* | 5/2022 | Colenbrander | G06T 1/20 | |
| 2022/0334864 A1* | 10/2022 | K N | G06F 8/61 | |
| 2023/0066013 A1* | 3/2023 | Ball | G06F 21/606 | |
| 2023/0315655 A1* | 10/2023 | Choquette | G06F 9/522 | 711/154 |

OTHER PUBLICATIONS

Cheng, Yingying, and Xiaohua Jia. "NAMP: Network-aware multipathing in software-defined data center networks." IEEE/ACM Transactions on Networking 28.2 (2020): 846-859.*

Tian, Feng, et al. "Accelerating distributed deep learning using multi-path RDMA in data center networks." Proceedings of the ACM Sigcomm Symposium on SDN Research (SOSR). 2021.*

Banerjee, Amitabha, Rishi Mehta, and Zach Shen. "NUMA aware I/O in virtualized systems." 2015 IEEE 23rd Annual Symposium on High-Performance Interconnects. IEEE, 2015.*

Pang, Pu, et al. "Pac: Preference-aware co-location scheduling on heterogeneous numa architectures to improve resource utilization." Proceedings of the 37th international conference on supercomputing. 2023.*

Liu, Ming, and Tao Li. "Optimizing virtual machine consolidation performance on NUMA server architecture for cloud workloads." ACM Sigarch Computer Architecture News 42.3 (2014): 325-336.*

Wang, Yongyu. "NUMA-aware design and mapping for pipeline network functions." 2017 4th International Conference on Systems and Informatics (ICSAI). IEEE, 2017.*

Patra, P. et al., Toward a Sweet Spot of Data Plane Programmability, Portability, and Performance: On the Scalability of Multi-Architecture P4 Pipelines, IEEE Journal on Selected Areas in Communications, 2018, 36 (12):2603-2611.

European Patent Office, Extended Search Report, Application No. 24195925.3, Dec. 19, 2024, 10 pages.

* cited by examiner

NUMA-AWARE OUTPUT INTERFACE SELECTION

BACKGROUND

As datacenter networking becomes more advanced, it has become more common for network devices performing logical networking operations to have multiple network interfaces. These different network interfaces may be associated with different NUMA (non-uniform memory access) nodes of the network device. Logical networking operations that bundle the interfaces together (e.g., for ECMP purposes) may result in cross-NUMA traffic, which is very resource intensive. As such, ensuring that data traffic is not sent between NUMA nodes is important for ensuring that the network device performs efficiently.

BRIEF SUMMARY

Some embodiments provide a method for a data message processing device, having multiple network interfaces associated with multiple different non-uniform memory access (NUMA) nodes, to select between otherwise equivalent output options for data messages in a NUMA-aware manner. When the data message processing device receives a data message at a first network interface associated with a first NUMA node and identifies multiple output options with equal forwarding cost for the data message based on processing of the data message, the device selects one of the output options that is associated with the first NUMA node. That is, the device applies a preference to use an output option associated with the same NUMA node at which the data message was received to avoid cross-NUMA node processing of the data message.

In some embodiments, the data message processing device is an edge device that processes data messages between a logical network implemented in a datacenter and an external network (i.e., a network external to the logical network). The edge device, in some embodiments, implements a logical router with multiple uplink interfaces connecting to external routers as well as a set of logical switches that connect to the logical router (or to an intermediary logical router). Each of the uplinks is associated with one or more of the network interfaces of the edge device. Logical network endpoints executing on host computers in the datacenter connect (logically) to the logical switches, and for each logical switch, the edge device uses multiple tunnel endpoints (e.g., virtual tunnel endpoints (VTEPs)) to encapsulate data traffic directed to these logical network endpoints.

When the edge device receives a data message sent from a logical network endpoint and directed to an external destination, the edge device performs logical router processing on the data message and identifies an uplink via which to output the outgoing data message. In some embodiments, the logical router processing identifies an equal-cost multipath (ECMP) rule with multiple routes having equal forwarding cost. Each of these routes specifies a respective external router next-hop address and a respective output network interface (or logical router uplink that corresponds to an output network interface). In some embodiments, the edge device stores various metadata with the data message (e.g., logical context information), including the NUMA node associated with the network interface at which the data message was received. If the ECMP rule includes indicators as to the NUMA node associated with each route (i.e., based on the output uplink specified for the route), then the edge device can narrow the potential list of ECMP routes to only routes associated with the NUMA node on which the data message was received. This may be a single route or multiple routes, depending on the number of uplinks associated with each NUMA node. In the latter case, the edge device may perform a load balancing operation among the ECMP routes associated with the particular NUMA node (e.g., using a hash operation).

Similar principles are applied to data messages received at the edge device from the external network and directed to a logical network endpoint. In this case, the edge device applies logical router processing which identifies a logical switch (e.g., based on the destination network address of the data message). The edge device then applies the processing for this logical switch and, based on the destination data link address, determines a destination host computer (corresponding to a destination tunnel endpoint) on which the logical network endpoint operates. In some cases, the edge device has the option to use multiple different source tunnel endpoints (e.g., VTEPs) via which to send the data message through a physical network to the destination host computer, which are of equal forwarding cost. These source tunnel endpoints can correspond to different network interfaces of the edge device, and thus to different NUMA nodes. As such, the edge device again uses the metadata indicating the NUMA node associated with the network interface at which the data message was received as a preference to narrow the list of potential tunnel endpoints so as to avoid cross-NUMA node processing (and then load balancing between the tunnel endpoints associated with the NUMA node).

In addition, for either an incoming or outgoing data message, in some cases the edge device datapath (that performs the logical network processing) will need to send the data message to another application executing on the edge device (and then, potentially, receive the data message back from this application). Specifically, in some embodiments the datapath only performs layer 2-layer 4 (L2-L4) operations (e.g., switching, routing, network address and port translation, L4 load balancing), while other applications execute on the edge device perform layer 5-layer 7 (L5-L7) operations (e.g., L7 load balancing, TLS proxy, URL filtering, etc.). To send a data message to such an application, in some embodiments the datapath outputs the data message to a transport interface (e.g., a kernel network interface (KNI)) that passes the data message from the user space to a network stack in the kernel space of the device). The transport interfaces, like the network interfaces, are each associated with a respective NUMA node. As such, when selecting a transport interface via which to send a data message to an L7 application, the datapath again prefers the interface associated with the NUMA node on which the data message was received (and if multiple transport interfaces are associated with this NUMA node, load balancing across these interfaces).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for a data message processing device, having multiple network interfaces associated with multiple different non-uniform memory access (NUMA) nodes, to select between otherwise equivalent output options for data messages in a NUMA-aware manner. When the data message processing device receives a data message at a first network interface associated with a first NUMA node and identifies multiple output options with equal forwarding cost for the data message based on processing of the data message, the device selects one of the output options that is associated with the first NUMA node. That is, the device applies a preference to use an output option associated with the same NUMA node at which the data message was received to avoid cross-NUMA node processing of the data message.

Figure 1:
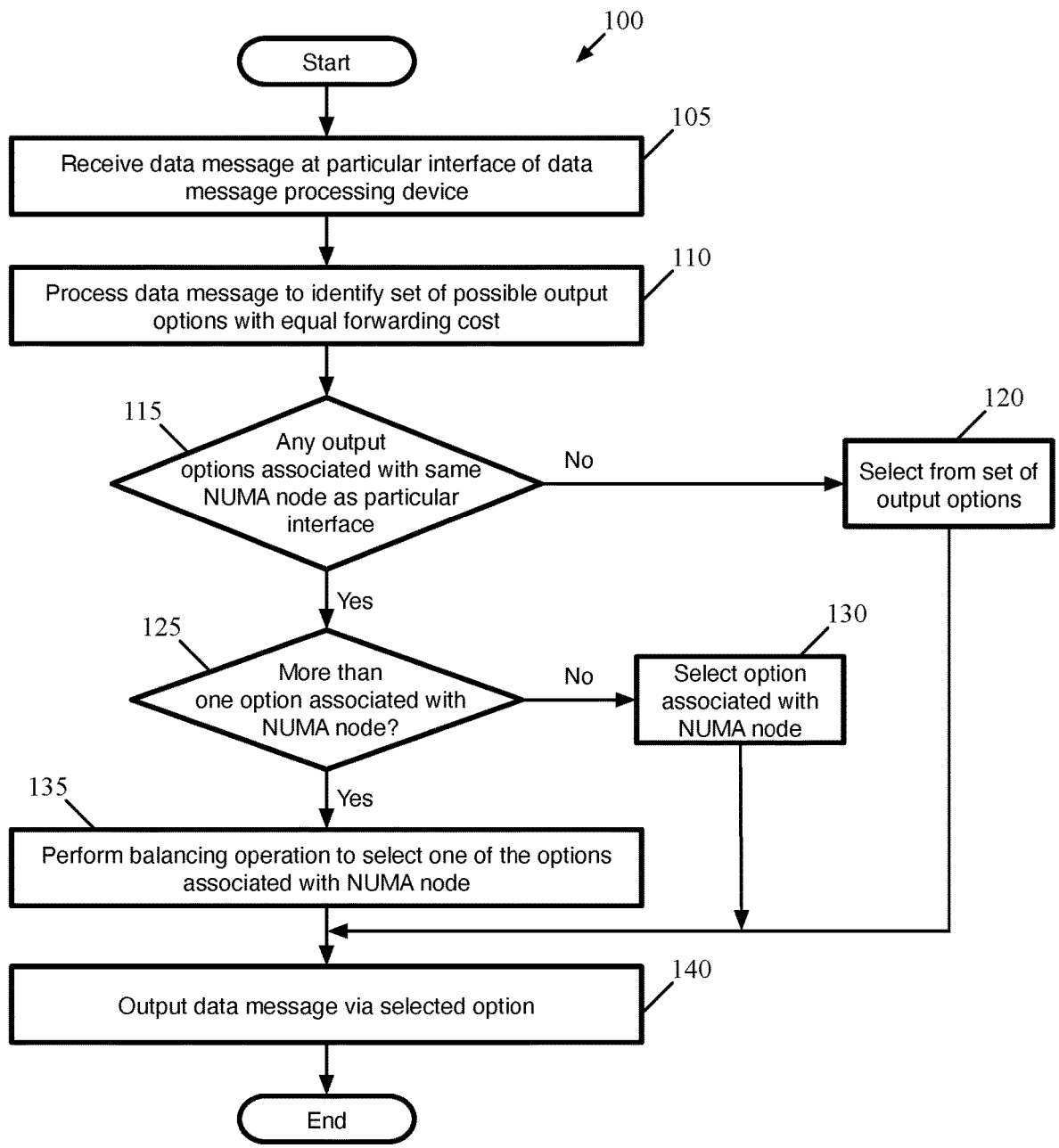
FIG. 1 conceptually illustrates a process of some embodiments for processing a data message in a NUMA-aware manner.

FIG. 1 conceptually illustrates a process 100 of some embodiments for processing a data message in a NUMA-aware manner. In some embodiments, the process 100 is performed by an edge device that processes data messages between a logical network implemented in a datacenter and an external network (i.e., a network external to the logical network), although the process may be performed by other data message processing devices with multiple NUMA nodes. The device may be a bare metal device with multiple physical NUMA nodes, a virtual machine (VM) with multiple virtual NUMA nodes (i.e., backed by multiple physical NUMA nodes), or another type of device that processes network data traffic and has multiple processing cores with multiple NUMA nodes.

As shown, the process 100 begins by receiving (at 105) a data message at a particular interface of the data message processing device. In some embodiments, this interface is a physical or virtual network interface controller (NIC) associated with a particular one of the data message processing device's NUMA nodes. In addition, though not shown, in some embodiments the device stores the data message in memory associated with the same NUMA node as the particular interface. Some embodiments store the data message as a set of fields that includes various data message headers (e.g., source and destination addresses, protocols, etc.) as well as additional metadata (e.g., logical networking context). In some such embodiments, the metadata also includes an indicator specifying the NUMA node at which the data message was received.

The process 100 then processes (at 110) the data message to identify a set of (one or more) possible output options that have equal forwarding costs. In some embodiments, the processing is performed by a thread that executes on a particular core of the edge device. This core is associated with the same NUMA node as the memory in which the data message is stored (and the NIC at which the data message was received) and thus processing of the data message does not involve any cross-NUMA processing.

It should be noted that, in certain cases, the device will actually block or drop the data message (e.g., based on a firewall rule) rather than identify output options for the data message. In various different embodiments, the identified output options may be different types of outputs. For example, the output options could be equal-cost multi-path (ECMP) routes that specify (or map to) different NICs of the device or tunnel endpoints (e.g., virtual tunnel endpoints (VTEPs)) that correspond to different NICs of the device. In other embodiments, the output options are transport interfaces (e.g., kernel network interfaces (KNIs)) that enable transport of the data message from a datapath that performs the data message processing on the device to another application executing on the device. As the different identified options all have equal forwarding cost, without NUMA-aware data message processing, the edge device would select from among all of these identified options (e.g., using a load balancing algorithm), irrespective of whether the selected output option would result in cross-NUMA processing.

Having identified the set of potential output options, the process 100 determines (at 115) whether any of the output options are associated with the same NUMA node as the particular interface at which the data message was received. It should be noted that the process 100 is a conceptual process and that the data message processing device may not perform all of these operations in the specific manner shown in the figure. For instance, while some embodiments first identify all potential output options, then narrow these options in a NUMA-aware manner, and then select one of the remaining options, other embodiments combine all or some of these operations into a single operation that identifies and selects an output option in a NUMA-aware manner.

If none of the identified output options are associated with the same NUMA node as the interface at which the data message was received, the process 100 selects (at 120) one of the output options from all of the identified output options. In some embodiments, this selection involves the device performing a load balancing operation among the various output options. The load balancing operation could involve a deterministic hash function (e.g., based on a set of data message header fields), a round robin or similar load balancing operation, a load balancing operation that assesses the current load on different interfaces, etc.

In this case, because none of the identified output options are associated with the NUMA node on which the data message was received and stored in memory, the data message processing device is required to perform the more resource (and time) intensive cross-NUMA processing. This may occur if, for example, the data message is routed to a specific next hop requiring output through a NIC associated with a different NUMA node if the different NICs of the device do not have equivalent connectivity.

On the other hand, if at least one of the output options is associated with the same NUMA node as the interface at which the data message was received, the process 100 determines (at 125) whether there is more than one such output option. If only one output option is associated with the NUMA node, the process 100 selects (at 130) that option in order to avoid cross-NUMA processing of the data message.

If more than one identified output option is associated with the same NUMA node as the interface at which the data message was received, the process 100 performs (at 135) a balancing operation to select one of the options associated with that NUMA node. The balancing operation could involve a deterministic hash function (e.g., based on a set of data message header fields), a round robin or similar load balancing operation, a load balancing operation that assesses the current load on different interfaces, etc. Some embodiments use a deterministic operation based on connection parameters associated with the data message (e.g., source and/or destination network address, source and/or destination transport layer port, transport layer protocol) so that all data messages for a given connection are output via the same interface (or other type of output option).

Finally, the process 100 outputs (at 140) the data message via the selected option. In some embodiments, this entails sending the data message onto a network (e.g., a physical network) via a selected interface. If the output interface is facing a logical overlay network, in some embodiments the data message is output with an encapsulation header. If the output interface is facing an external network, in some embodiments the output data message is an inner data message with an encapsulation header removed during processing by the device. In other embodiments, the output interface is a software interface (e.g., a KNI or a VNIC).

As noted above, in some embodiments, the data message processing device is an edge device that processes data messages between a logical network implemented in a datacenter and an external network (i.e., a network external to the logical network). The edge device, in some embodiments, implements a logical router with multiple uplink interfaces connecting to external routers as well as a set of logical switches that connect to the logical router (or to an intermediary logical router).

Figure 2:
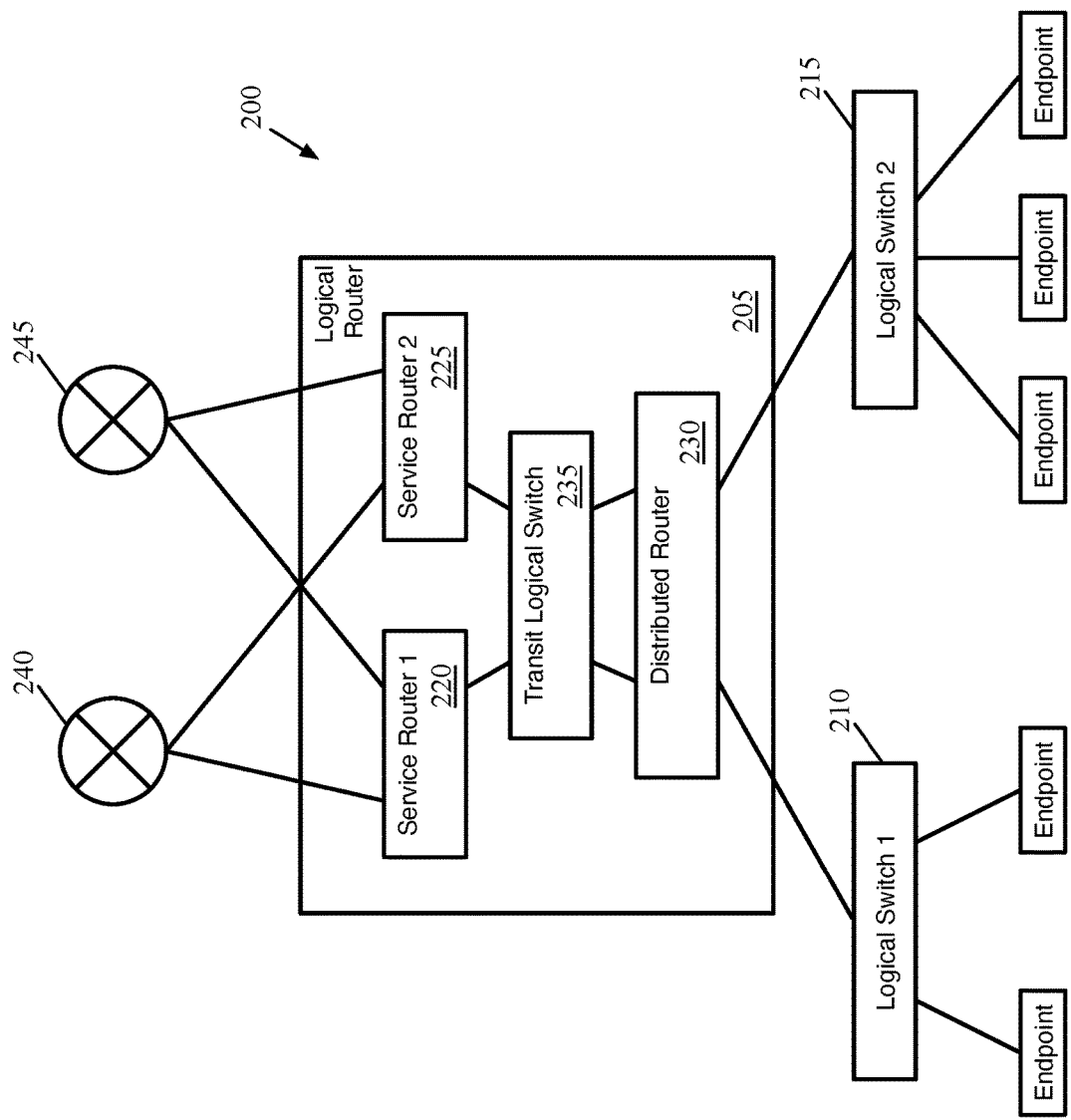
FIG. 2 conceptually illustrates an example of a logical network of some embodiments.

FIG. 2 conceptually illustrates an example of such a logical network 200 of some embodiments. The logical network 200 includes a logical router 205 as well as two logical switches 210 and 215 that connect to the logical router 205. Various logical network endpoints (implemented as, e.g., virtual machines, containers, etc.) that are sources and destinations for data messages processed by the logical network elements 205-215 connect to these logical switches 210 and 215. It should be noted that, in some embodiments, a logical network includes a first-tier logical router that connects the logical network to an external network as well as multiple second-tier logical routers that are interposed between groups of logical switches and the first-tier logical router. In this latter case, the second-tier logical routers may segregate different groups of logical switches and provide different services for data traffic to and from these logical switches.

In some embodiments, a network administrator (or other user) defines a logical router with one or more uplinks as a gateway between the logical network and an external network through a network management system and the network management system internally defines several routing components of this logical router. As shown in FIG. 2, the logical router 205 is defined to include two service routers 220 and 225 (also referred to as centralized routing components) and a distributed router 230 (also referred to as a distributed routing component), with a transit logical switch 235 connecting internal interfaces of these routing components 220-230.

The service routers 220 and 225 are defined to have two uplinks each, with equivalent connectivity between the two service routers. In some embodiments, the network administrator defines uplink interface groups, with one member of each group assigned to each of the service routers 220 and 225. The service routers 220 and 225 may be implemented in active-standby mode (e.g., as a pair of service routers) or in active-active mode (e.g., as any number of service routers) in some embodiments. As shown, the uplinks of the service routers 220 and 225 connect to two different external routers 240 and 245, which provide connectivity to external networks (e.g., to the public Internet, a different datacenter via virtual private network, etc.).

Figure 3:
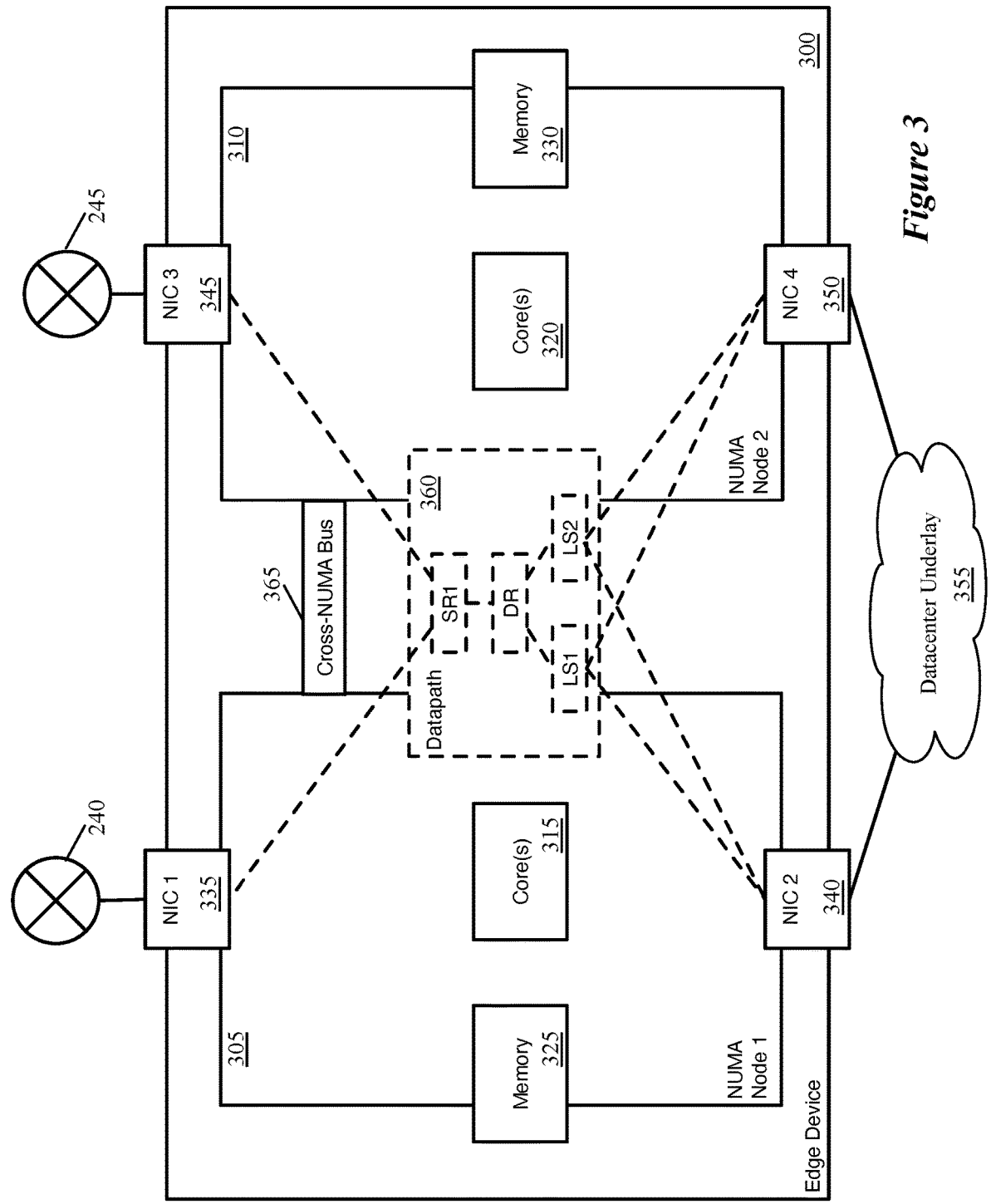
FIG. 3 conceptually illustrates an edge device of some embodiments that implements one of the service routers of the logical network of FIG. 2.

FIG. 3 conceptually illustrates an edge device 300 of some embodiments that implements one of the service routers 220 (or 225) of the logical router 205. The edge device 300 is a physical computing device (e.g., a bare metal computing device), but it should be understood that the discussion herein equally applies to a virtual edge device (e.g., implemented in a VM). In this case, the illustrated physical resources would correspond to virtual resources (e.g., the physical processing cores corresponding to virtual processors, the physical memory corresponding to virtual memory that maps to physical memory in different NUMA nodes, the NICs corresponding to VNICs that map to physical NICs of the physical device on which the virtual edge device is implemented, etc.).

In this figure, hardware elements of the edge device are shown with solid lines, while software executing on the edge device is shown using dashed lines. The edge device 300 includes two sets of processing cores 315 and 320 (each of which may include one or more cores) with associated memories 325 and 330 (each of which may include any number of memory units) that operate as two separate NUMA nodes 305 and 310. In addition, the edge device 300 includes a cross-NUMA bus 365 for handling processing across the NUMA node (e.g., when one of the processing cores 315 needs to access data in the memories 330 or one of the processing cores 320 needs to access data in the memories 325).

The edge device also includes two NICs 335 and 345 connecting respectively to the external routers 240 and 245 and two NICs 340 and 350 connecting to a datacenter underlay network 355 (i.e., the physical network of the datacenter in which the logical network is implemented and to which the edge device 300 belongs). The NICs 335 and 340 are each associated with the first NUMA node 305 while the NICs 345 and 350 are each associated with the second NUMA node 310. It should be noted that in some embodiments the NICs 335 and 340 are actually the same NIC while the NICs 345 and 350 are also the same NIC. In some such embodiments, each of these NICs connects to a top of rack (TOR) switch or other network element that is able to function as both (i) a router connecting the logical network to external networks and (ii) a connection to the datacenter underlay network 355. It should also be understood that the edge device 300 may include multiple NICs associated with each of its (two or more) NUMA nodes in some embodiments.

The edge device 300 executes, potentially among other software (e.g., KNIs, network stack(s), other applications for performing layer 7 (L7) data message processing), a datapath 360. In some embodiments, the datapath 360 is a data plane development kit (DPDK)-based datapath that executes (i) a set of data message processing threads and (ii) a set of control processing threads (for handling control plane processes such as per-logical router QoS tracking, routing protocol (e.g., BGP) processing, etc.). In some embodiments, each data message processing thread (which is a run-to-completion thread) is pinned to a respective processing core, with the control threads scheduled between the other cores. Because each data message processing thread is pinned to a specific core, each of these threads is associated with a specific NUMA node (i.e., the NUMA node with which its core is associated).

When processing a data message, the datapath 360 implements at least a subset of the logical network elements of logical network 200. The edge device 300 is assigned one of the service routers 220 and 225, and thus the datapath 360 is configured to implement this service router as well as the distributed router 230 (and transit logical switch 235) and both of the logical switches 210 and 215. In some embodiments, the datapath 360 stores configuration data for each of these logical network elements. In some embodiments, northbound (outgoing) data messages typically have logical switch and distributed router processing applied at the source of the data message (per first-hop processing principles), and thus the datapath 360 only applies the service router processing (and the transit logical switch in order to identify that service router processing is required) for these data messages. On the other hand, for southbound (incoming) data messages, the datapath 360 applies service router, distributed router, and logical switch processing.

Each of the uplinks of the service router 220 (or 225) is associated with one or more of the northbound NICs 335 and 345 of the edge device 300. Because these NICs 335 and 345 are associated with the two different NUMA nodes 305 and 310, the datapath 360 can opt to output some northbound data messages via the first NUMA node 305 and other northbound data messages via the second NUMA node 310.

For a southbound data message, once the datapath 360 applies logical switch processing (for either logical switch 210 or 215), this processing typically identifies a logical egress port (corresponding to the destination logical network endpoint MAC address in the data message) and specifies to output the data message via a VTEP or set of VTEPs (the data message will be encapsulated using the network address associated with the selected VTEP). Each of the VTEPs corresponds to a one of the southbound NICs 340 and 350, in some embodiments, and thus is associated with the corresponding NUMA nodes 305 and 310. The VTEPs typically have equivalent connectivity into the datacenter underlay 355, and thus the datapath 360 can select either of the NICs 340 and 350 for a given southbound data message (in order to avoid cross-NUMA traffic).

Figure 4A:
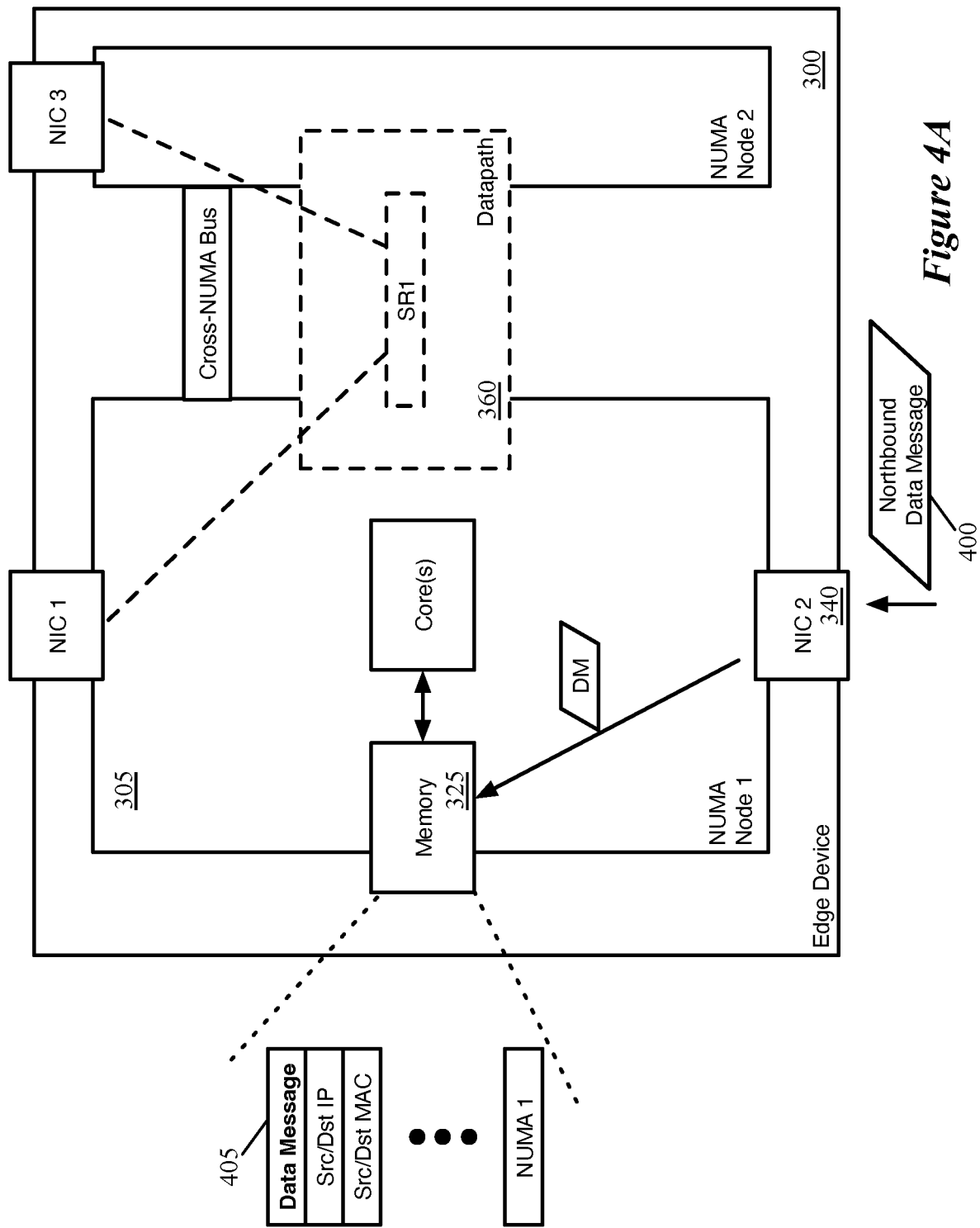
FIGS. 4A-B conceptually illustrate the processing of a northbound data message by the edge device of FIG. 3.
Figure 4B:
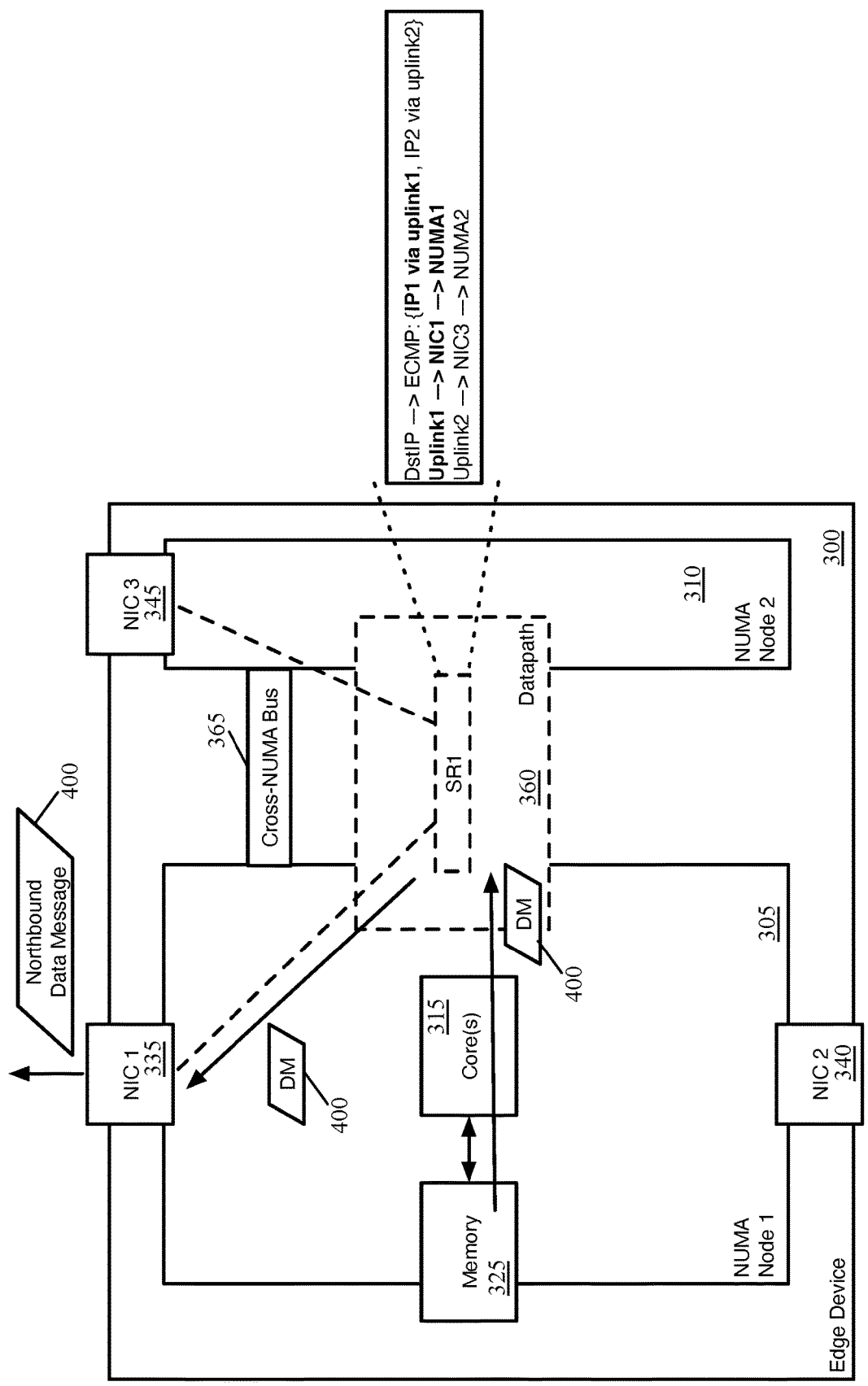

FIGS. 4A-B conceptually illustrate the processing of a northbound data message 400 by the edge device 300. As shown in FIG. 4A, the data message 400 is received at the south-facing NIC 340. Because this NIC 340 is associated with NUMA node 305, the data message properties are stored in one of the memories 325. In some embodiments, the data message 400 is stored in memory as a data message object 405 that can be manipulated by the datapath 360. As shown, the data message 405 includes a set of fields such as the source and destination IP addresses, source and destination MAC addresses, and various other header fields (Ethertype, transport protocol, L7 payload, etc.). In addition, the data message object 405 includes various metadata fields that are not part of the data message 400 on the wire but provide additional data with which the datapath 360 processes the data message. These metadata fields include an indicator as to the NUMA node on which the data message was received (and therefore the NUMA node at which the data message object is stored) as well as other fields (e.g., logical ingress or egress port, logical forwarding element identifiers, etc.).

FIG. 4B shows the datapath 360 processing this data message 400 (e.g., once the data message is popped from a queue of data messages to process). In some embodiments, one of the datapath threads pinned to a core 315 associated with the first NUMA node 305 is assigned to process the data message 400 and thus accesses the data message object 405 in the memory 325.

As noted, for northbound data messages sent from a logical network endpoint and directed to an external destination, the datapath 360 performs service router processing on the data messages and identifies an uplink via which to output the outgoing data message. In this case, based on the destination IP address of the data message 400, the datapath 360 identifies a set of ECMP routes specifying to output the data message 400 either to next-hop IP address IP1 (i.e., the IP address of external router 240) via a first uplink of the service router 220 or to next-hop IP address IP2 (i.e., the IP address of external router 245) via a second uplink of the service router 220. Without NUMA-aware processing, the datapath 360 would choose between these two uplinks assuming equal forwarding cost (e.g., by using a load balancing mechanism). However, the datapath logical router configuration also specifies an associated NUMA node for each of the possible routes. In this case, the first uplink maps to the first NIC 335, which is associated with the first NUMA node 305, while the second uplink maps to the third NIC 345, which is associated with the second NUMA node 310. Based on these mappings and the metadata indicating that the data message is associated with the first NUMA node 305, the datapath 360 selects the first route (via the first uplink mapping to the NIC 335) and outputs the data message via the first NIC 335 (rather than performing a load balancing operation that could result in the data message having to be output through the NIC 345 via the cross-NUMA bus 365.

Figure 5A:
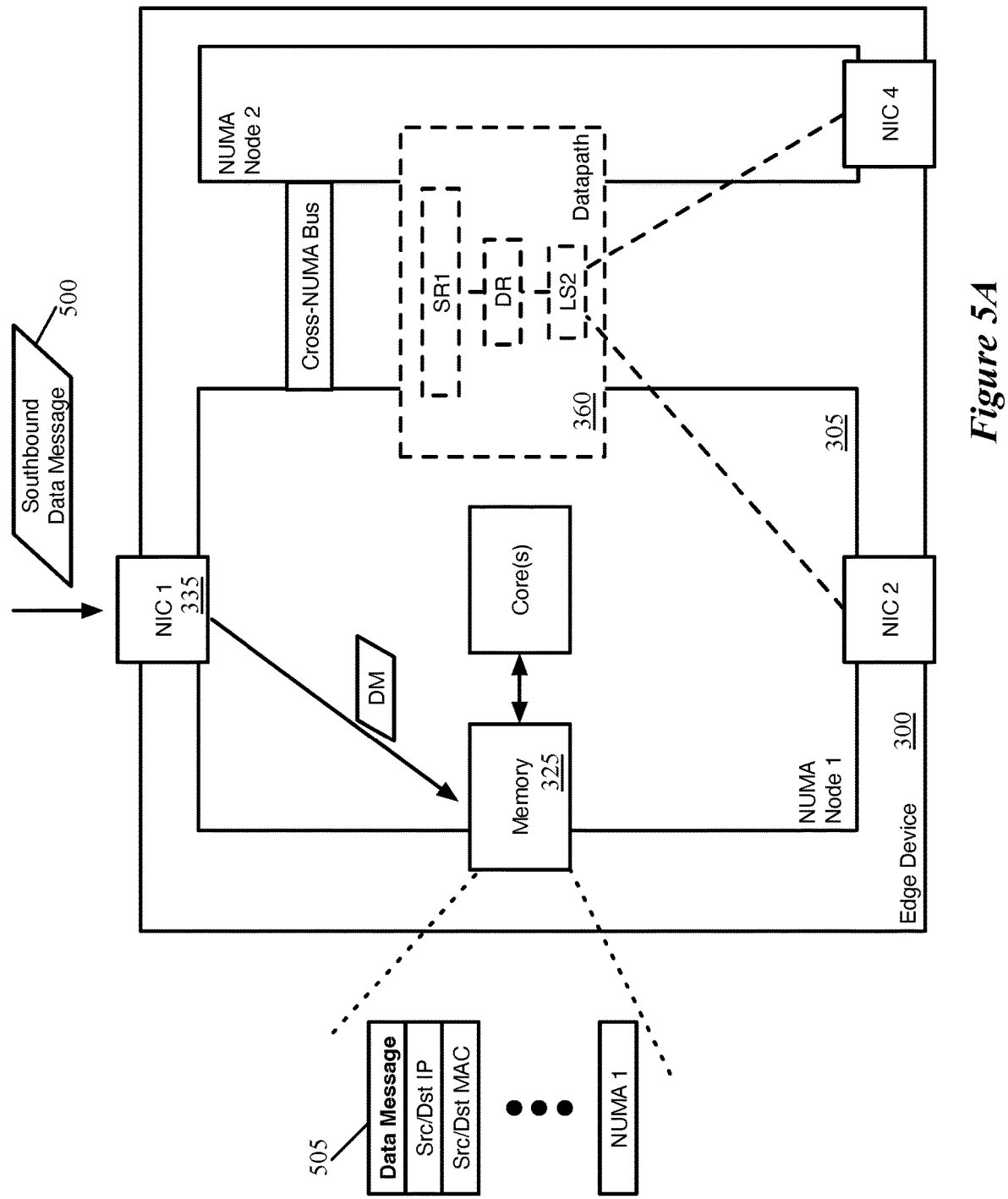
FIGS. 5A-B conceptually illustrate the processing of a southbound data message by the edge device of FIG. 3.
Figure 5B:
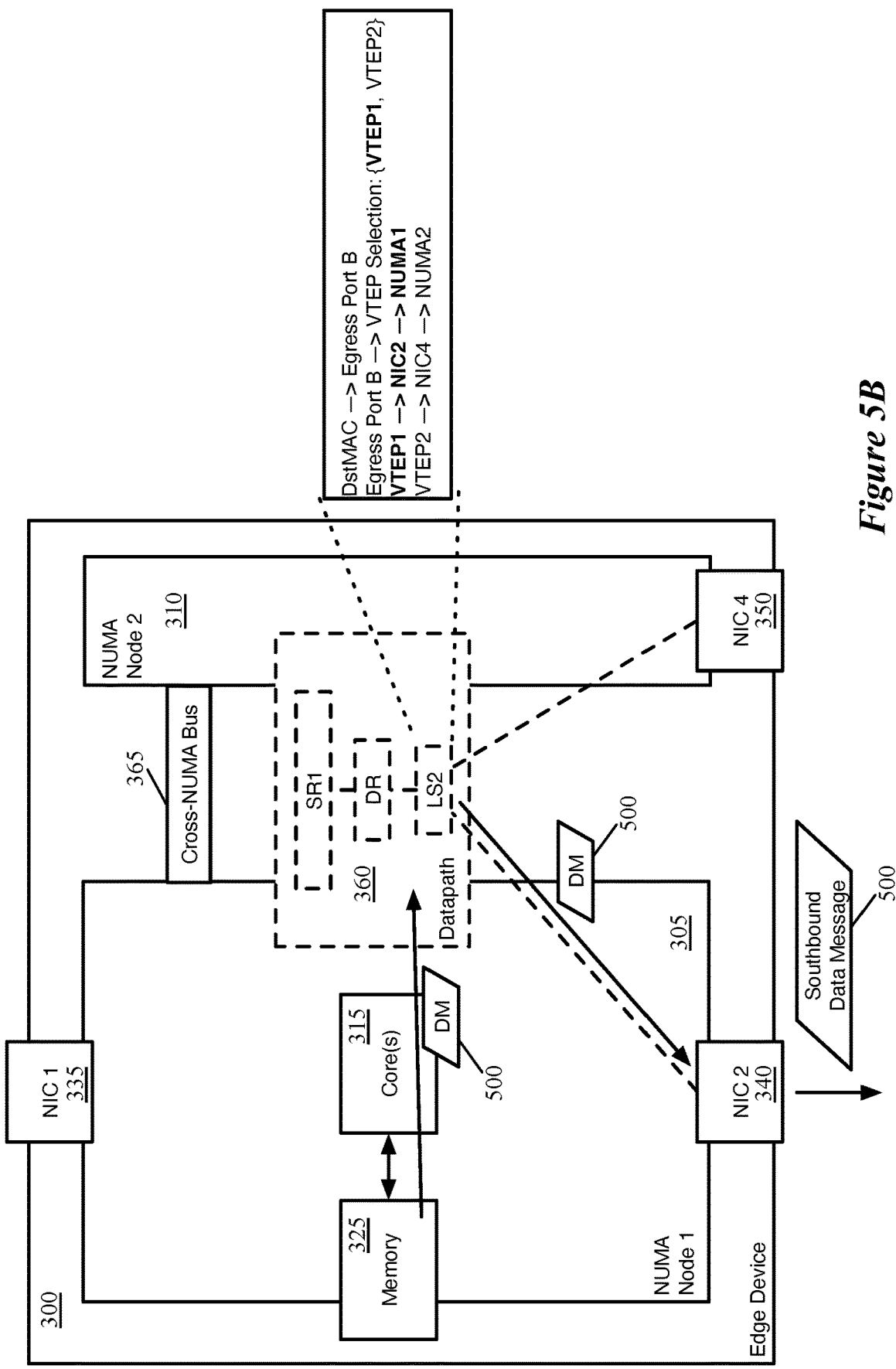

Similar principles are applied to data messages received at the edge device from the external network and directed to a logical network endpoint. FIGS. 5A-B conceptually illustrate the processing of a southbound data message 500 by the edge device 300. As shown in FIG. 5A, the data message 500 is received at the north-facing NIC 335. Because this NIC 335 is associated with NUMA node 305, the data message properties are stored in one of the memories 325. In some embodiments, the data message 500 is stored in memory as a data message object 505 that can be manipulated by the datapath 360. As shown, the data message 505 includes a set of fields such as the source and destination IP addresses, source and destination MAC addresses, and various other header fields (Ethertype, transport protocol, L7 payload, etc.). In addition, the data message object 505 includes various metadata fields that are not part of the data message 500 on the wire but provide additional data with which the datapath 360 processes the data message. These metadata fields include an indicator as to the NUMA node on which the data message was received (and therefore the NUMA node at which the data message object is stored) as well as other fields (e.g., logical ingress or egress port, logical forwarding element identifiers, etc.).

FIG. 5B shows the datapath 360 processing this data message 500 (e.g., once the data message is popped from a queue of data messages to process). In some embodiments, one of the datapath threads pinned to a core 315 associated with the first NUMA node 305 is assigned to process the data message 500 and thus accesses the data message object 505 in the memory 325

As noted, for southbound data messages sent from an external destination to a logical network endpoint, the datapath 360 initially applies service router processing which identifies the distributed router 230) as a next hop. The distributed router processing applied by the datapath 360 identifies one of the logical switches (in this case, the second logical switch 215) based on the destination IP address of the data message 500 (it should be noted that in some cases the service router and distributed router processing is combined into a single routing table for southbound data messages). The datapath 360 then applies the processing for this logical switch 215 and, based on the destination MAC address, determines a destination host computer (corresponding to a destination tunnel endpoint) on which the logical network endpoint having that MAC address operates.

In some cases, the edge device has the option to use multiple different source tunnel endpoints (e.g., VTEPs) via which to send the data message through the physical underlay network 355 to the destination host computer. In this example, the datapath 360 identifies a logical egress port of the logical switch 215 based on the destination MAC address (after the logical router processing performs any needed ARP and replaces the destination MAC address of the data message object 505). This logical egress port maps to a pair of possible source VTEPs, which can be used to reach the destination with equal forwarding cost. Without NUMA-aware processing, the datapath 360 would choose between these two source VTEPs assuming this equal forwarding cost (e.g., by using a load balancing mechanism). However, the datapath logical switch configuration also specifies an associated NUMA node for each of these VTEPs. In this case, the first VTEP maps to the second NIC 340, which is associated with the first NUMA node 305, while the second VTEP maps to the fourth NIC 350, which is associated with the second NUMA node 310. Based on these mappings and the metadata indicating that the data message is associated with the first NUMA node 305, the datapath 360 selects the first VTEP and thus encapsulates the data message using this as the source IP address for the encapsulation header. The datapath 360 outputs the data message via the second NIC 340, rather than performing a load balancing operation that could result in the data message having to be output through the NIC 350 via the cross-NUMA bus 365.

In addition, for either an incoming or outgoing data message, in some cases the edge device datapath (that performs the logical network processing) will need to send the data message to another application executing on the edge device (and then, potentially, receive the data message back from this application). Specifically, in some embodiments the datapath only performs layer 2-layer 4 (L2-L4) operations (e.g., switching, routing, network address and port translation, L4 load balancing), while other applications execute on the edge device perform layer 5-layer 7 (L5-L7) operations (e.g., L7 load balancing, TLS proxy, URL filtering, etc.).

Figure 6:
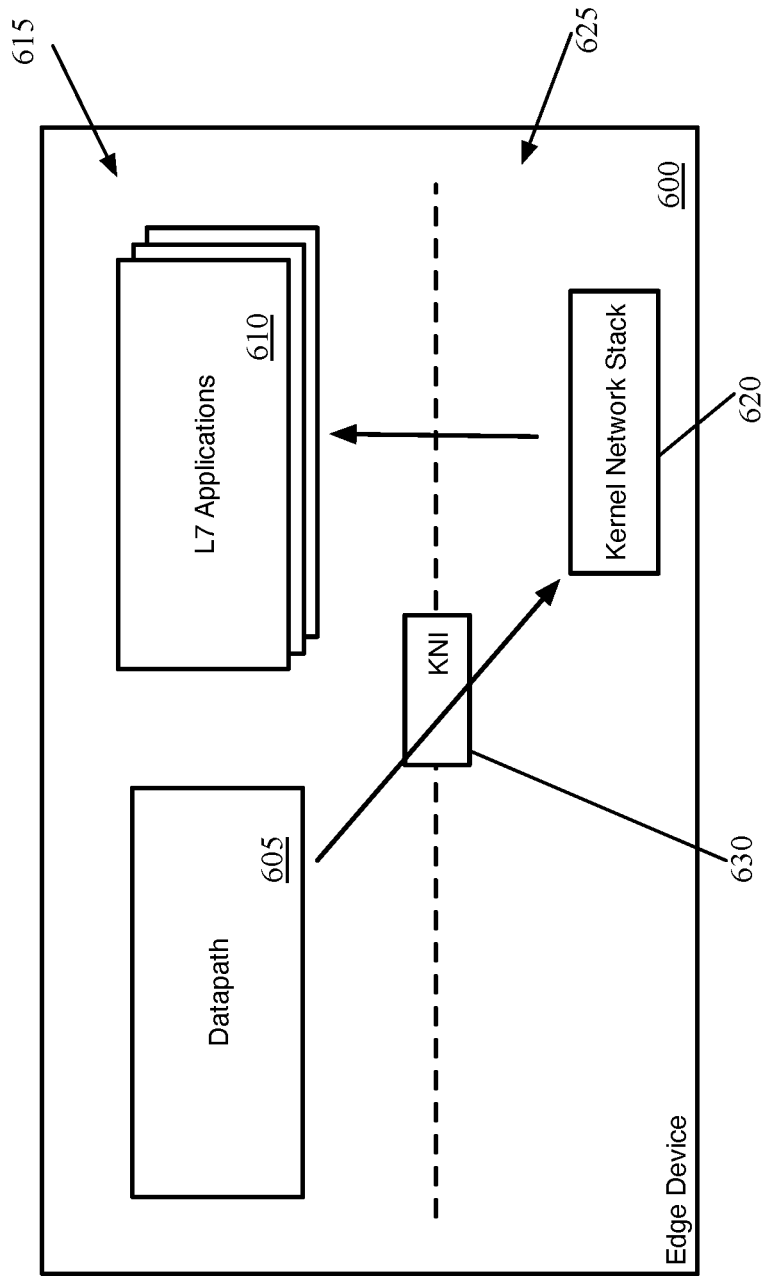
FIG. 6 conceptually illustrates the path via which data messages are sent from a datapath to L7 applications on an edge device according to some embodiments.

FIG. 6 conceptually illustrates the path via which data messages are sent from a datapath to L7 applications on an edge device 600 according to some embodiments. As shown, a datapath 605 and a set of L7 applications 610 execute within a user space 615 of the edge device, while a kernel network stack (e.g., a TCP/IP stack) 620 executes in the device kernel 625. To send a data message from the datapath 605 to one of the L7 applications 610, in some embodiments the datapath 605 outputs the data message to a kernel network interface (KNI) 630 that passes the data message from the user space 615 to the network stack 620 in the kernel space 625 of the edge device 600. The L7 applications 610, in some embodiments, are designed such that they receive data messages from the kernel network stack 620, so the kernel network stack 620 provides the data message to the appropriate L7 application 610. In some embodiments, the data messages use the return path (from L7 application 610 to kernel network stack 620 to datapath 605 (via the KNI 630) when one of the L7 applications 610 passes a data message back to the datapath 605 (i.e., after performing its processing on the data message).

In some embodiments, an edge device includes multiple KNIs that can each be used to reach the network stack(s) in the kernel, with each KNI (or other transport interface) associated with a respective NUMA node like the NICs. In other embodiments, the device includes a single KNI with multiple queues, each of which is associated with a different NUMA node. In either case, the datapath is configured to avoid cross-NUMA traffic when selecting between KNIs (or between KNI queues).

Figure 7A:
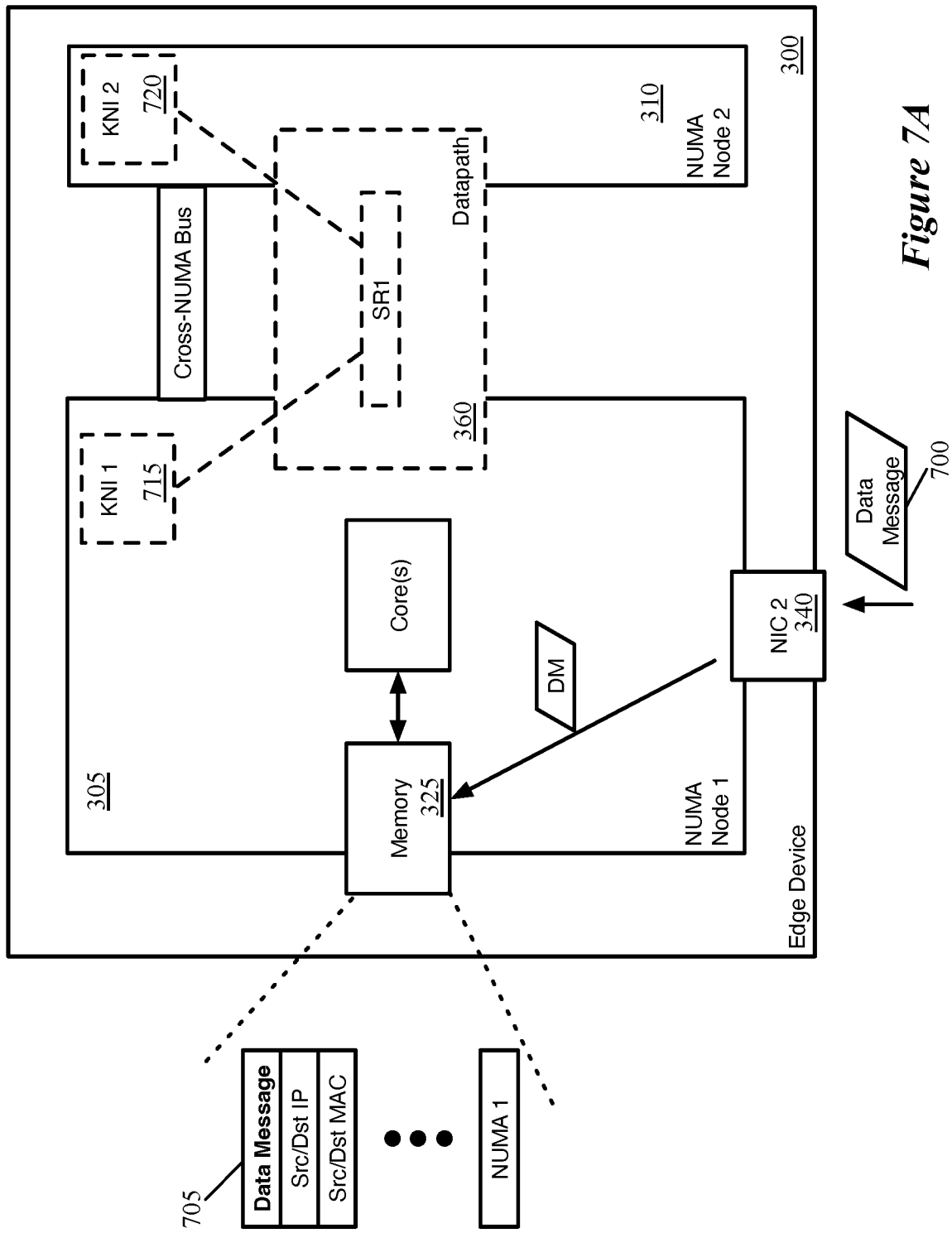
FIGS. 7A-B conceptually illustrate the processing of a northbound data message that is sent to an L7 application by the edge device of FIG. 3.
Figure 7B:
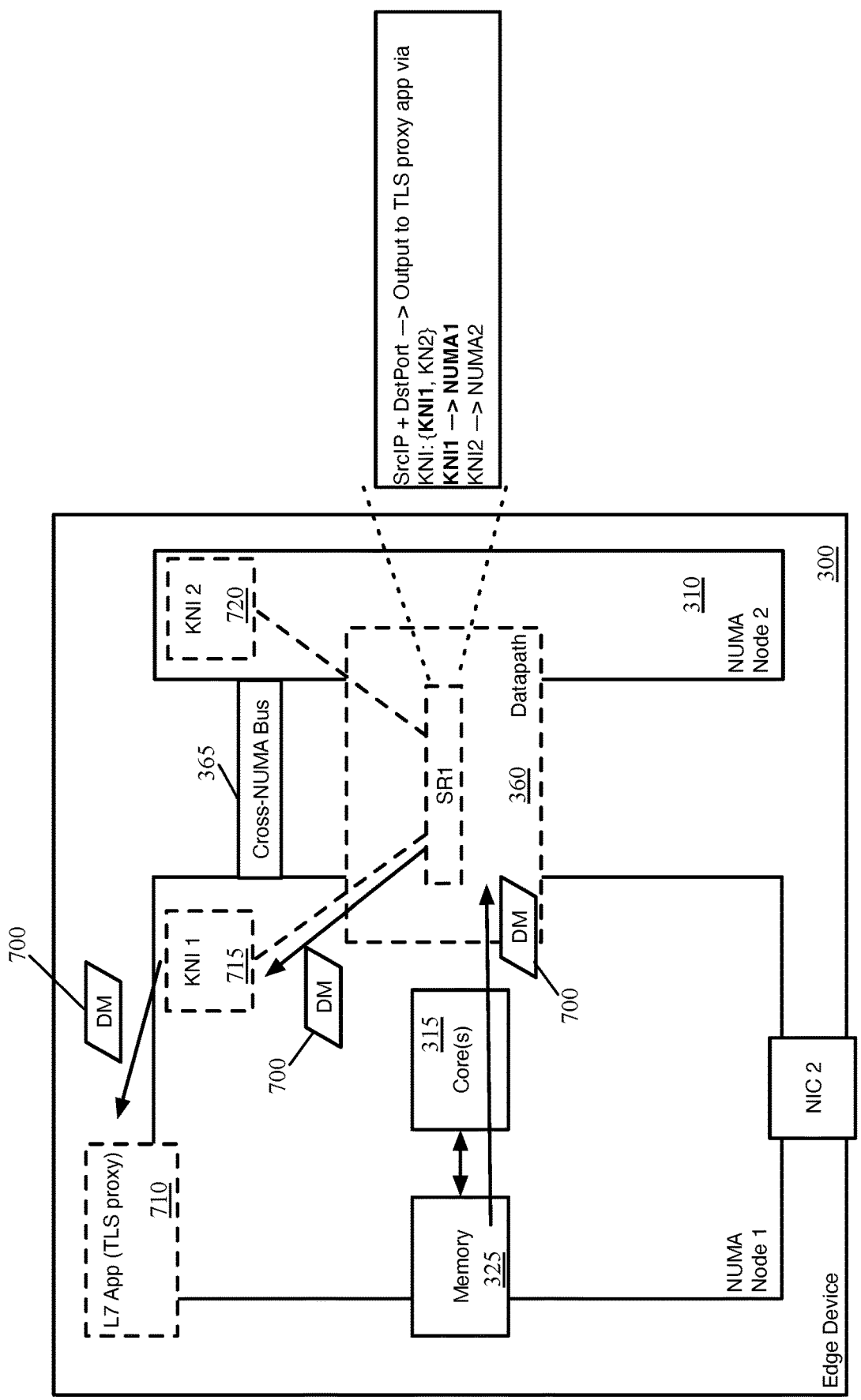

FIGS. 7A-B conceptually illustrate the processing of a northbound data message 700 that is sent to an L7 application 710 by the edge device 300. As shown in FIG. 7A, the data message 700 is received at the south-facing NIC 340. Because this NIC 340 is associated with NUMA node 305, the data message properties are stored in one of the memories 325. In some embodiments, the data message 700 is stored in memory as a data message object 705 that can be manipulated by the datapath 360. This figure also illustrates that the device executes a first KNI 715 on the first NUMA node 305 and a second KNI 720 on the second NUMA node 310. Each of these KNIs can be used to send data traffic to a set of L7 applications in some embodiments.

As shown, the data message 705 includes a set of fields such as the source and destination IP address, source and destination MAC address, and various other header fields (Ethertype, transport protocol, L7 payload, etc.). In addition, the data message object 705 includes various metadata fields that are not part of the data message 700 on the wire but provide additional data with which the datapath 360 processes the data message. These metadata fields include an indicator as to the NUMA node on which the data message was received (and therefore the NUMA node at which the data message object is stored) as well as other fields (e.g., logical ingress or egress port, logical forwarding element identifiers, etc.).

FIG. 7B shows the datapath 360 processing this data message 700 (e.g., once the data message is popped from a queue of data messages to process). In some embodiments, one of the datapath threads pinned to a core 315 associated with the first NUMA node 305 is assigned to process the data message 700 and thus accesses the data message object 705 in the memory 325.

As discussed (and shown in FIG. 4B), for northbound data messages sent from a logical network endpoint and directed to an external destination, the datapath 360 performs service router processing on the data message. In this case, rather than initially identifying an uplink via which to output the data message, the datapath 360 identifies a set of KNIs to which the datapath can output the data message. Here, a policy-based routing rule specifies that, based on the source IP and destination port of the data message 700, to pass the data message 700 to a TLS proxy application 710 via either of the two KNIs 715 and 720. Without NUMA-aware processing, the datapath 360 would choose between these two KNIs 715 and 720 assuming equal forwarding cost (e.g., by using a load balancing mechanism). However, the datapath logical router configuration also specifies an associated NUMA node for each of the KNIs 715 and 720. In this case, the first KNI 715 is associated with the first NUMA node 305 while the second KNI 720 is associated with the second NUMA node 310. Based on these mappings and the metadata indicating that the data message is associated with the first NUMA node 305, the datapath 360 selects the first KNI 715 to which to output the data message 700. The datapath 360 sends the data message 700 to the TLS proxy application 710 via the selected KNI 715.

Figure 8A:
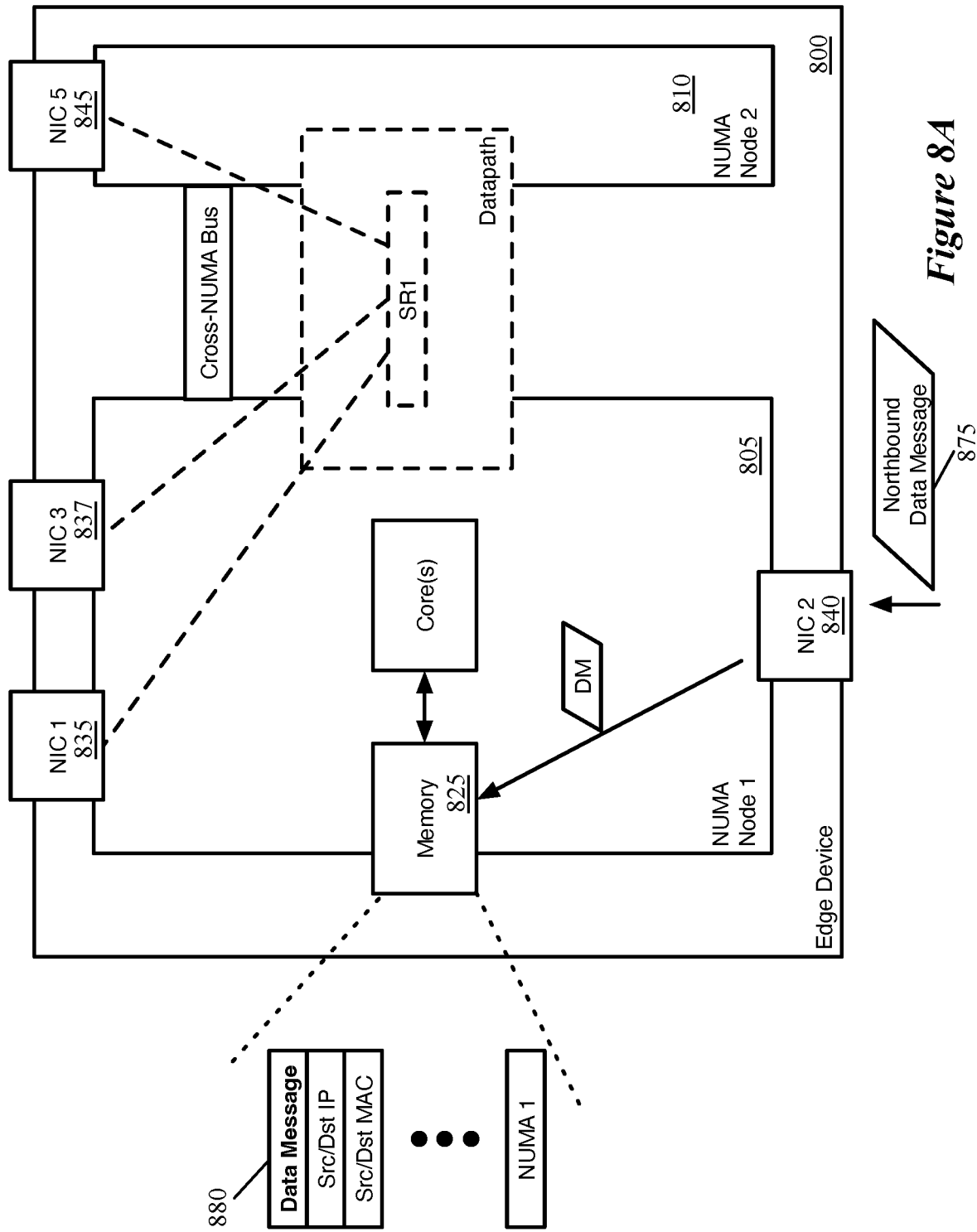
FIGS. 8A-B conceptually illustrate the processing of a northbound data message by an edge device.
Figure 8B:
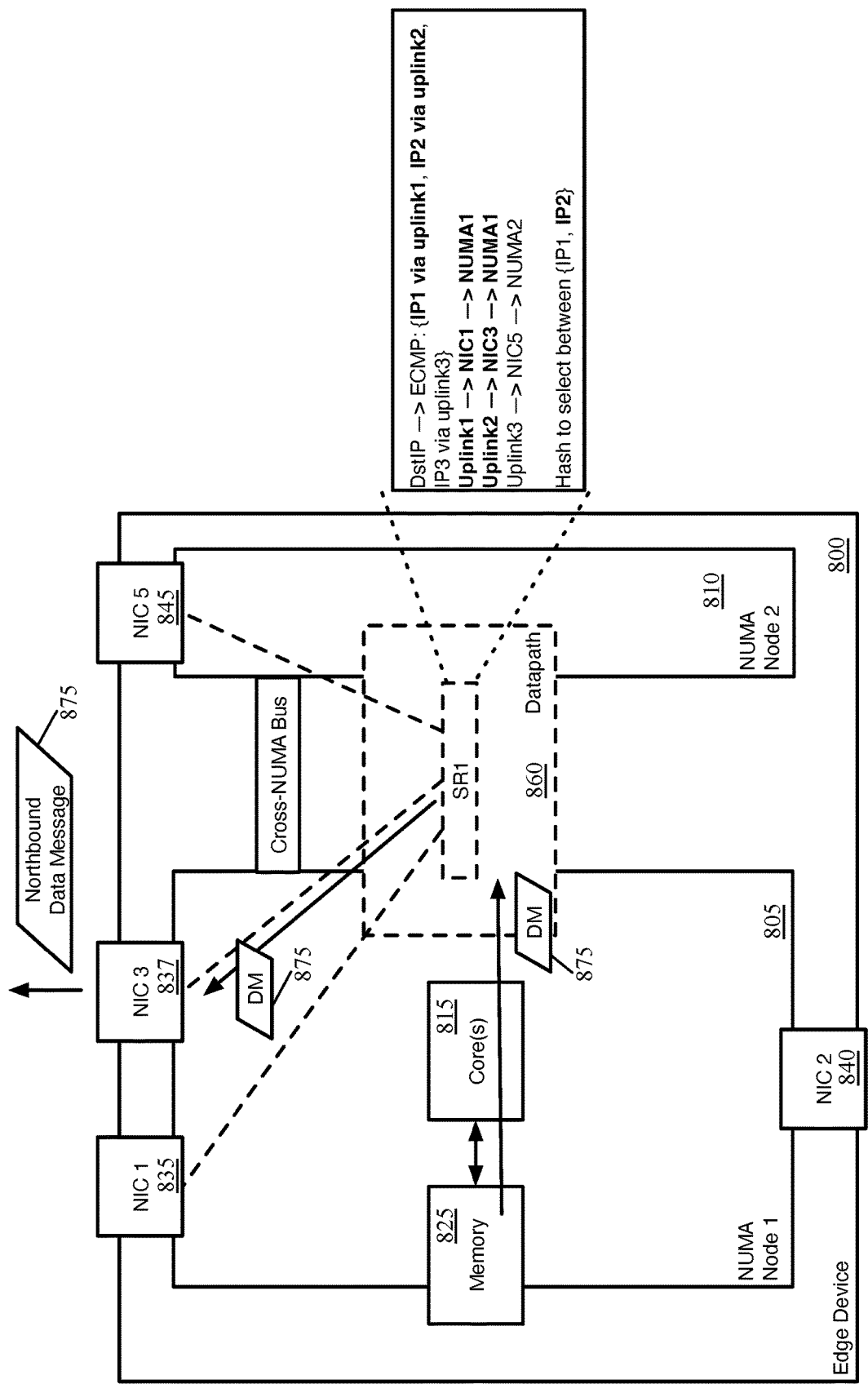

As mentioned above, in some cases multiple output options may be associated with the same NUMA node, in which case the data message processing device of some embodiments load balances between the options associated with the NUMA node on which a data message is received. FIGS. 8A-B conceptually illustrate the processing of a northbound data message 875 by an edge device 800. The edge device 800 is similar to the edge device 300 except that the device 800 includes three north-facing NICs 835, 837, and 845, two of which are associated with the first NUMA node 805.

As shown in FIG. 8A, the data message 875 is received at the south-facing NIC 840. Because this NIC 840 is associated with NUMA node 805, the data message properties are stored in one of the memories 825 associated with that NUMA node 805 as a data message object 880.

FIG. 8B shows the datapath 860 processing this data message 875 (e.g., once the data message is popped from a queue of data messages to process). In some embodiments, one of the datapath threads pinned to a core 815 associated with the first NUMA node 805 is assigned to process the data message 875 and thus accesses the data message object 880 in the memory 825.

As in the examples described above for northbound data messages, the datapath 860 performs service router processing on the data message 875 and identifies an uplink via which to output the outgoing data message. In this case, based on the destination IP address of the data message 875, the datapath 860 identifies a set of ECMP routes specifying to output the data message 875 to next-hop IP address IP1 via a first uplink of the service router, to next-hop IP address IP2 via a second uplink of the service router, or to next-hop IP address IP3 via a third uplink of the service router. Without NUMA-aware processing, the datapath 860 would choose between these three uplinks assuming equal forwarding cost (e.g., by using a load balancing mechanism). However, the datapath logical router configuration also specifies an associated NUMA node for each of the possible routes. In this case, the first uplink maps to the first NIC 835, the second uplink maps to the third NIC 837, and the third uplink maps to the fifth NIC 845. The first and second uplinks thus maps to NICs associated with the first NUMA node 805 while the third uplink maps to a NIC associated with the second NUMA node 810. Based on these mappings and the metadata indicating that the data message is associated with the first NUMA node 805, the datapath 860 performs a load balancing operation to select between the first two next-hop IP addresses (e.g., using a hashing algorithm). In this example, the load balancing operation selects the second uplink so the datapath 860 outputs the data message 875 via the third NIC 837.

Figure 9:
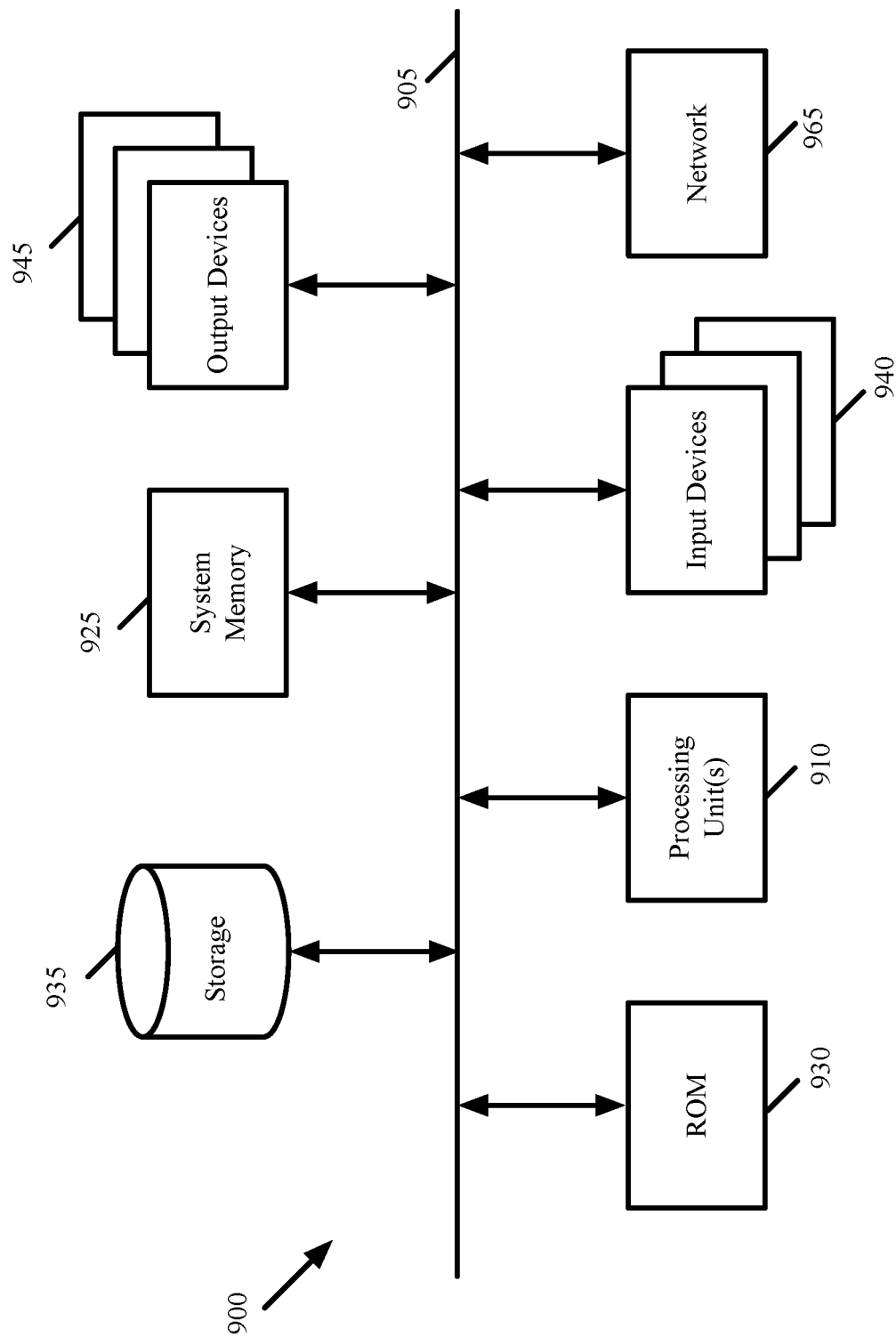
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random-access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 1) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method comprising:
    at a data message processing device comprising multiple network interfaces associated with at least two different non-uniform memory access (NUMA) nodes:
        receiving a data message at a first network interface associated with a particular one of the NUMA nodes;
        based on processing of the data message, identifying a plurality of output options for the data message, wherein (i) each of the output options has an equal forwarding cost and (ii) each output option is associated with a respective one of the NUMA nodes; and
        selecting an output option for the data message that is associated with the particular NUMA node to avoid cross-NUMA node processing of the data message.

2. The method of claim 1, wherein the data message processing device is an edge device that processes data messages between a logical first network implemented in a datacenter and an external second network.

3. The method of claim 2, wherein the plurality of output options are equal-cost multi-path (ECMP) routes for sending the data message to routers in the external second network, each respective ECMP route specifying (i) a respective external router next-hop network address and (ii) a respective output network interface.

4. The method of claim 3, wherein an ECMP rule used by the edge device to identify the plurality of ECMP routes indicates, for each respective ECMP route, the NUMA node with which the respective output network interface is associated.

5. The method of claim 2, wherein the plurality of output options are virtual tunnel endpoints (VTEPs) for tunneling the data message to a particular host computer in the datacenter based on processing for a particular logical switch to which the data message is routed, each respective VTEP associated with a respective network interface.

6. The method of claim 5, wherein a VTEP selection rule associated with the particular logical switch indicates, for each respective VTEP, the NUMA node with which the respective network interface is associated.

7. The method of claim 2, wherein the edge device executes (i) a datapath that performs the processing of the data message, (ii) a set of applications that perform layer 7 processing on data messages and return data messages to the datapath, and (iii) a plurality of transport interfaces that enable data messages to be transported between the datapath and the applications, each transport interface associated with a respective one of the NUMA nodes.

8. The method of claim 7, wherein the plurality of output options comprises a set of the transport interfaces for transporting the data message to a particular application based on logical router processing indicating that a particular type of layer 7 processing performed by the particular application is required for the data message.

9. The method of claim 1, wherein the data message processing device stores metadata for use in processing the data message, the metadata comprising an indicator for the particular NUMA node associated with the first network interface at which the data message is received.

10. The method of claim 1, wherein the selected output option is associated with the first network interface.

11. The method of claim 1, wherein the plurality of output options comprises at least two different output options with equal forwarding cost that are associated with the particular NUMA node.

12. The method of claim 11, wherein selecting the output option comprises using a load balancing algorithm that selects between the at least two different output options associated with the particular NUMA node.

13. A non-transitory machine-readable medium storing a program for execution by at least one processing unit of a message processing device comprising multiple network interfaces associated with at least two different non-uniform memory access (NUMA) nodes, the program comprising sets of instructions for:
receiving a data message at a first network interface associated with a particular one of the NUMA nodes;
based on processing of the data message, identifying a plurality of output options for the data message, wherein (i) each of the output options has an equal forwarding cost and (ii) each output option is associated with a respective one of the NUMA nodes; and
selecting an output option for the data message that is associated with the particular NUMA node to avoid cross-NUMA node processing of the data message.

14. The non-transitory machine-readable medium of claim 13, wherein the data message processing device is an edge device that processes data messages between a logical first network implemented in a datacenter and an external second network.

15. The non-transitory machine-readable medium of claim 14, wherein:
the plurality of output options are equal-cost multi-path (ECMP) routes for sending the data message to routers in the external second network, each respective ECMP route specifying (i) a respective external router next-hop network address and (ii) a respective output network interface; and
an ECMP rule used by the edge device to identify the plurality of ECMP routes indicates, for each respective ECMP route, the NUMA node with which the respective output network interface is associated.

16. The non-transitory machine-readable medium of claim 14, wherein:
the plurality of output options are virtual tunnel endpoints (VTEPs) for tunneling the data message to a particular host computer in the datacenter based on processing for a particular logical switch to which the data message is routed, each respective VTEP associated with a respective network interface; and
a VTEP selection rule associated with the particular logical switch indicates, for each respective VTEP, the NUMA node with which the respective network interface is associated.

17. The non-transitory machine-readable medium of claim 14, wherein:
the program is a datapath program that performs the processing of the data message;
the edge device also executes (i) a set of applications that perform layer 7 processing on data messages and return data messages to the datapath and (ii) a plurality of transport interfaces that enable data messages to be transported between the datapath and the applications, each transport interface associated with a respective one of the NUMA nodes; and
the plurality of output options comprises a set of the transport interfaces for transporting the data message to a particular application based on logical router processing indicating that a particular type of layer 7 processing performed by the particular application is required for the data message.

18. The non-transitory machine-readable medium of claim 13, wherein the data message processing device stores metadata for use in processing the data message, the metadata comprising an indicator for the particular NUMA node associated with the first network interface at which the data message is received.

19. The non-transitory machine-readable medium of claim 13, wherein the selected output option is associated with the first network interface.

20. The non-transitory machine-readable medium of claim 13, wherein: the plurality of output options comprises at least two different output options with equal forwarding cost that are associated with the particular NUMA node; and the set of instructions for selecting the output option comprises a set of instructions for using a load balancing algorithm that selects between the at least two different output options associated with the particular NUMA node.

* * * * *